(12) United States Patent
Cha et al.

(10) Patent No.: US 11,142,924 B1
(45) Date of Patent: Oct. 12, 2021

(54) VEHICLE CONNECTION SYSTEM OF MULTI-STORY BUILDING AND CONTROL METHOD THEREOF

(71) Applicants: Hyundai Motor Company, Seoul (KR); Kia Motors Corporation, Seoul (KR)

(72) Inventors: Dong Eun Cha, Hwaseong-Si (KR); Jin Ho Hwang, Cheonan-si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/035,387

(22) Filed: Sep. 28, 2020

(30) Foreign Application Priority Data

Jun. 1, 2020 (KR) .......................... 10-2020-0065731

(51) Int. Cl.
*E04H 6/22* (2006.01)
*E04H 6/42* (2006.01)

(52) U.S. Cl.
CPC ............... *E04H 6/22* (2013.01); *E04H 6/422* (2013.01)

(58) Field of Classification Search
CPC .. E04H 6/22; E04H 6/422; E04H 6/18; E04H 6/24; B65G 1/0414; B65G 1/0492; B65G 1/065
See application file for complete search history.

(56) References Cited

U.S. PATENT DOCUMENTS

| 6,149,366 A * | 11/2000 | Deandrea ............. B65G 1/0414 414/279 |
| 10,538,192 B2 | 1/2020 | Zhou et al. |
| 2013/0085596 A1* | 4/2013 | Shani ........................ G06F 7/00 700/217 |
| 2015/0175354 A1* | 6/2015 | Kharkover ........... B65G 1/0478 414/231 |
| 2020/0026295 A1 | 1/2020 | Schimik |

FOREIGN PATENT DOCUMENTS

CN 209324085 U * 8/2019

* cited by examiner

*Primary Examiner* — Glenn F Myers
(74) *Attorney, Agent, or Firm* — Morgan, Lewis & Bockius LLP

(57) ABSTRACT

A vehicle connection system of a multi-story building, may include a building having a plurality of floors, provided with an elevator moving between the plurality of floors, and having at least one station provided inside or outside of the building so that the vehicle is configured to be docked to the at least a station; an elevator board provided at a bottom portion of the elevator to allow the vehicle to be loaded to the elevator or unloaded from the elevator and moving between floors of the building when the elevator is driven; a parking robot which is placed in a standby state on the elevator board, and when the vehicle enters the elevator board, allows the vehicle to be loaded on the elevator board and moved to a docking point; and a server communicatively connected to the building, the elevator board, and the parking robot, to manage statuses of the stations, and designate the docking point when the vehicle enters the elevator, and transmit the same to the elevator board and the parking robot.

17 Claims, 6 Drawing Sheets

VEHICLE CONNECTION SYSTEM OF MULTI-STORY BUILDING AND CONTROL METHOD THEREOF

CROSS REFERENCE TO RELATED APPLICATION

The present application claims priority to Korean Patent Application No. 10-2020-0065731, filed Jun. 1, 2020, the entire contents of which is incorporated herein for all purposes by this reference.

BACKGROUND OF THE INVENTION

Field of the Invention

The present invention relates to a vehicle connection system of a multi-story building and control method thereof, in which when a vehicle is docked and connected to the multi-story building, the vehicle becomes a portion of the building, and the vehicle is docked to each floor by providing an elevator board that moves between floors of the building and a parking robot that transports vehicles.

Description of Related Art

A building is provided with independent compartments according to purposes, and a user occupies the space provided and utilizes the same. In the case of an office building, the employer provides a workplace in the building where workers will work, and the workers work in the workplace. Furthermore, in the case of a commercial building, a landlord installs facilities in each space of the commercial building to allow tenants to use the space, and the tenant rents the space and then installs the interior suitable for the purpose to open the business.

The buildings of such a traditional concept have many limitations, because they cannot reflect the individual's preference for each space, and once facilities are installed, a lot of money and time is required to change the facilities. Therefore, it is impossible to operate the facilities flexibly according to various environmental changes. Since each space of the building is provided as a space for performing a specific purpose, the space cannot be used for any purpose other than the specific purpose. This causes unnecessary space maintenance costs and thus increases in rental price.

Therefore, there is a demand for development of a building system that allows a user to use a specific space according to the user's intention and allows other users to use the specific space for different purposes when the user not utilizes the space. The above-described problems may be solved through a system in which the vehicle has a space for performing a special purpose, and then is caused to be docked to the building to become a portion of a building. There is a need of construction of a system in which a vehicle moves between floors to be docked to the multi-story building.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a control method thereof, in which a station to which a vehicle is docked is provided in a multi-story building, and when the vehicle is docked so that the vehicle becomes a portion of the building, the vehicle is transported to each story and then docked to the station by providing an elevator board and a parking robot.

To achieve the objective, various aspects of the present invention are directed to providing a vehicle connection system of a multi-story building, the system including a building having a plurality of floors, provided with an elevator moving between the plurality of floors, and having at least one station provided inside or outside of the building so that the vehicle is configured to be docked to the at least a station; an elevator board provided at a bottom portion of the elevator to allow the vehicle to be loaded to the elevator or unloaded from the elevator and moving between floors of the building when the elevator is driven; a parking robot which is placed in a standby state on the elevator board, and when the vehicle enters the elevator board, allows the vehicle to be loaded on the elevator board and moved to a docking point; and a server communicatively connected to the building, the elevator board, and the parking robot, to manage statuses of the stations, and designate the docking point when the vehicle enters the elevator, and transmit the same to the elevator board and the parking robot.

When the vehicle enters the elevator and then a desired floor is selected, the server may designate the docking point to transmit the same to the parking robot, and cause the elevator board to move to the selected floor and then the parking robot to move the vehicle to the docking point.

The parking robot may check a level of charge of a battery of the vehicle when the vehicle is loaded on, and charge the battery of the vehicle when it is determined that charging of the battery is required.

Furthermore, the elevator board may be connected to a power system of the building to charge the parking robot when the parking robot is placed in a standby state on the elevator board.

A plurality of parking robots may be provided at each floor of the building to check a level of charge of a battery of the vehicle docked at the station and to charge the battery of the vehicle when the parking robot concludes that charging of the battery is required.

A plurality of parking robots may be provided at each floor of the building, and when the vehicle is to be unloaded from the building, the server may designate any one of the parking robots at a floor where the docking point is located among the plurality of floors so that the vehicle to be unloaded is loaded on the designated parking robot.

The elevator may include a driving unit driving upward and downward movements of the elevator, an energy storage unit configured of storing electrical energy generated by the driving unit when the elevator board descends from a higher floor to a lower floor among the plurality of floors, and a control unit electrically connected to the driving unit and the energy storage unit and configured of controlling the driving unit and the energy storage unit.

The control unit may control to charge the elevator board using regenerative power stored in the energy storage unit.

The station may be provided outside the building, and the vehicle may be docked and connected to the outside of the building for the vehicle to be a portion of the building.

Furthermore, the station may be provided inside the building, and the vehicle may be docked and connected to the interior of the building for the vehicle to be a portion of the building.

The station may be provided with a sealing member configured of contacting a frame of the vehicle to be docked to form a seal.

Furthermore, various aspects of the present invention are directed to providing a method of controlling a vehicle connection system of a multi-story building, the method including loading a vehicle on a parking robot when the vehicle enters an elevator of the building; determining a docking point at which the vehicle is connected, and transmitting and receiving location information related to the docking point to or from an elevator board and the parking robot; driving the elevator so that the elevator board moves to a floor where the docking point is located, among the plurality of floors; and when the elevator board arrives on the floor where the docking point is located, moving the parking robot to the docking point in a state that the vehicle is loaded on, and docking the vehicle at the docking point to allow the building and the vehicle to be connected to each other.

After the docking of the vehicle, the method may further include, by the parking robot, checking a charging state of a battery in the docked vehicle and determining whether charging of the battery is required; and by the parking robot, charging a battery of the vehicle when it is determined that charging of the battery is required.

Furthermore, the determining whether the charging of the battery is required may include determining that the charging is required when a level of charging of the battery in the vehicle is equal to or less than a predetermined amount of a full level of charging.

According to a vehicle connection system of a multi-story building and a control method thereof according to various exemplary embodiments of the present invention, since the vehicle may be docked to each floor of a multi-story building to allow a user to occupy and use the space, and the vehicle may be transported to each floor, without mounting facilities and interiors for each purpose, there are effects of reducing the construction cost, lowering the rent, and increasing the usability of the space.

Furthermore, since the battery of the vehicle may be charged in a state that the vehicle is docked, it is possible to maintain a level of charge of the battery of the vehicle. Furthermore, since electrical energy may be produced by the elevator movement, there is an effect of improving the efficiency of energy.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
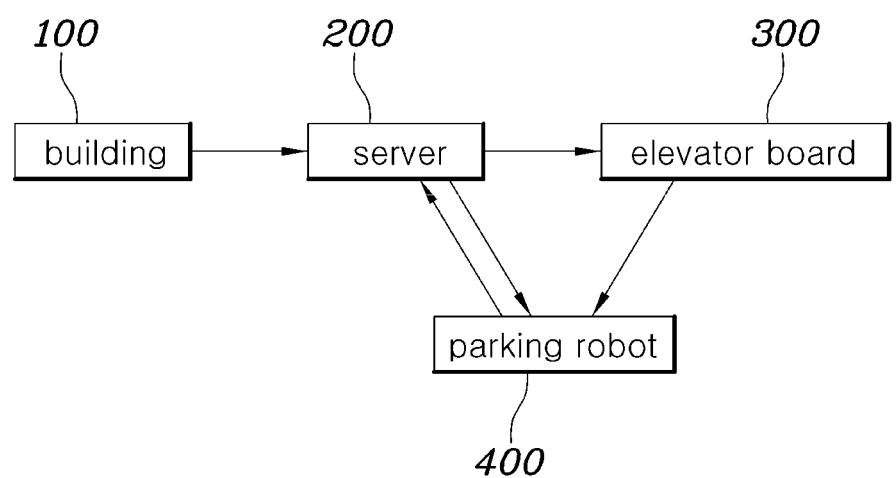
FIG. 1 is a schematic diagram showing a vehicle connection system of a multi-story building according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions with respect to the exemplary embodiments of the present invention included herein are exemplified only for explaining the exemplary embodiments according to various exemplary embodiments of the present invention, and the exemplary embodiments according to various exemplary embodiments of the present invention may be implemented in various forms and may not be construed as being limited to the exemplary embodiments described herein.

Since the exemplary embodiment according to various exemplary embodiments of the present invention can be applied to various changes and can have various forms, specific embodiments are intended to be illustrated in the drawings and described in detail in the specification. However, it may be understood that such specific embodiments are not intended to limit the exemplary embodiment according to the concept of the present invention to a specific disclosure form, and include all modifications, equivalents, or substitutes included in the spirit and scope of the present invention.

When an element is said to be "connected" or "coupled" to other component, it may be understood that the element may be directly connected to or connected to the other element, but another elements may be located between them. Meanwhile, when an element is said to be "directly connected" or "directly connected" to other element, it may be understood that no other elements are located between them. Other expressions describing the relationship between the elements, such as "between" and "immediately between" or "adjacent to" and "directly neighboring to" may be interpreted similarly.

Hereinafter, the present invention will be described in detail by explaining exemplary embodiments of the present invention with reference to the accompanying drawings. The same reference numerals in each drawing denote the same members.

The present invention includes a system in which when the vehicle V is docked and connected to a building 100, the internal spaces thereof are interconnected to each other so that the vehicle V functions as a portion of the building 100. The present invention includes a system in which the building 100 is not provided with individual spaces for specific purposes, and the individual vehicle V becomes an independent compartment, wherein the vehicle V is lifted up or down when the building 100 is a multi-story structure.

FIG. 1 is a schematic diagram showing a vehicle connection system of a multi-story building according to various exemplary embodiments of the present invention. Referring to FIG. 1, a vehicle connection system is configured to include a building 100, a server 200, an elevator board 300, and a parking robot 400.

The building 100 may be constructed with a multi-story structure. Each floor may be provided with a station 110 to which the vehicle V may be docked and connected. At least one station 110 may be provided at each floor, and when the vehicle V is docked and connected to each station 110, the internal space of the vehicle V and the internal space of the building 100 may be connected to each other.

In various exemplary embodiments of the present invention, the vehicle V may be a vehicle having an internal space configured for being used as an office space or a commercial office, such as a purpose built vehicle (PBV). A facility for a special purpose is not provided for each space resulting from partitioning the building 100, but each vehicle V having the facility for the special purpose is connected to each story, so that the vehicle V may become a portion of the building 100. That is, the internal space of each vehicle V becomes a space forming the building 100, such as a commercial space or an office space.

The building 100 may be provided with a common space 101 configured for being used in common. The common space 101 is a space configured for being used by anyone, such as conference rooms, educational facilities, sports facilities, cafeterias, and toilets. The common space 101 may be provided at the center portion of a region surrounded by a plurality of stations 110 to satisfy optimal movement lines with a plurality of docked vehicles V. When the building 100 and the vehicle V are connected to each other, an air conditioning system, a water and sewage system, a power system, and a communication system may be connected.

When only the common space 101 of the building 100 is designed and then the station 110 is provided upon designing the building 100, since the vehicle V is docked to form an individual space, the landlord may have an effect of reducing the cost consumed for design and construction. Furthermore, the user may have an effect of reducing the rent and cost consumed for the interior, since the vehicle V provided with facilities suitable for the purpose is decked to use the common space.

A sealing member 111 for contacting a frame of the docked vehicle V to form a seal may be provided at the external wall of the station 110. The sealing member 111 may be made of a flexible material to seal the gap without damaging a vehicle body. Since the seal is formed between the vehicle body and the external wall of the station 110 securely, it is possible to protect a personal space. The sealing member 111 makes it possible to shield noises and block the inflow of dust.

An elevator 120 moving between floors may be disposed in the building 100. The vehicle V may move between floors while being housed in the elevator 120. Therefore, the elevator 120 preferably has a size sufficient to allow the vehicle V to be housed.

The elevator board 300 is a device which is provided at the bottom portion of the elevator 120 to allow the vehicle V to be loaded or unloaded. When the vehicle V enters the elevator 120 so that the vehicle V may be docked to the station 110, the vehicle V is loaded on the elevator board 300. The elevator board 300 may move between floors of the building 100 in a state that vehicle V is loaded on, whereby the vehicle V may be moved to a desired floor.

The parking robot 400 is a device that transports the vehicle V to the station 110. The parking robot 400 is configured to allow the vehicle V to be loaded thereon, and is provided with wheels mounted at the bottom thereof for movement.

When the parking robot 400 is placed in a standby state on the elevator board 300, and the vehicle V enters the elevator board 300, the vehicle V is loaded on the parking robot 400. That is, the vehicle V may be loaded on the parking robot 400 placed on the elevator board 300 so that the vehicle is caused to move to the station 110. After the elevator board 300 moves to each floor, the parking robot 400 moves to the station 110 to dock the vehicle V in a state where the vehicle V is loaded. Accordingly, the parking robot 400 is away from the vehicle V to be placed on the elevator board 300 again.

The server 200 may perform a function of managing the status of the station 110 and determining a docking point. The docking point means a station 110 to which the vehicle V is docked and connected. To this end, the server 200 may be connected to the building 100, the elevator board 300, and the parking robot 400 by wired or wireless communication. The building 100 transmits information related to the docking state of the vehicle V in the station 110 of each floor to the server 110, and the server 200 may check whether the vehicle is docked to the station 200 and designate a new docking point when a new vehicle V enters. The docking point may be selected by the user or arbitrarily designated by the server 200.

Figure 2:
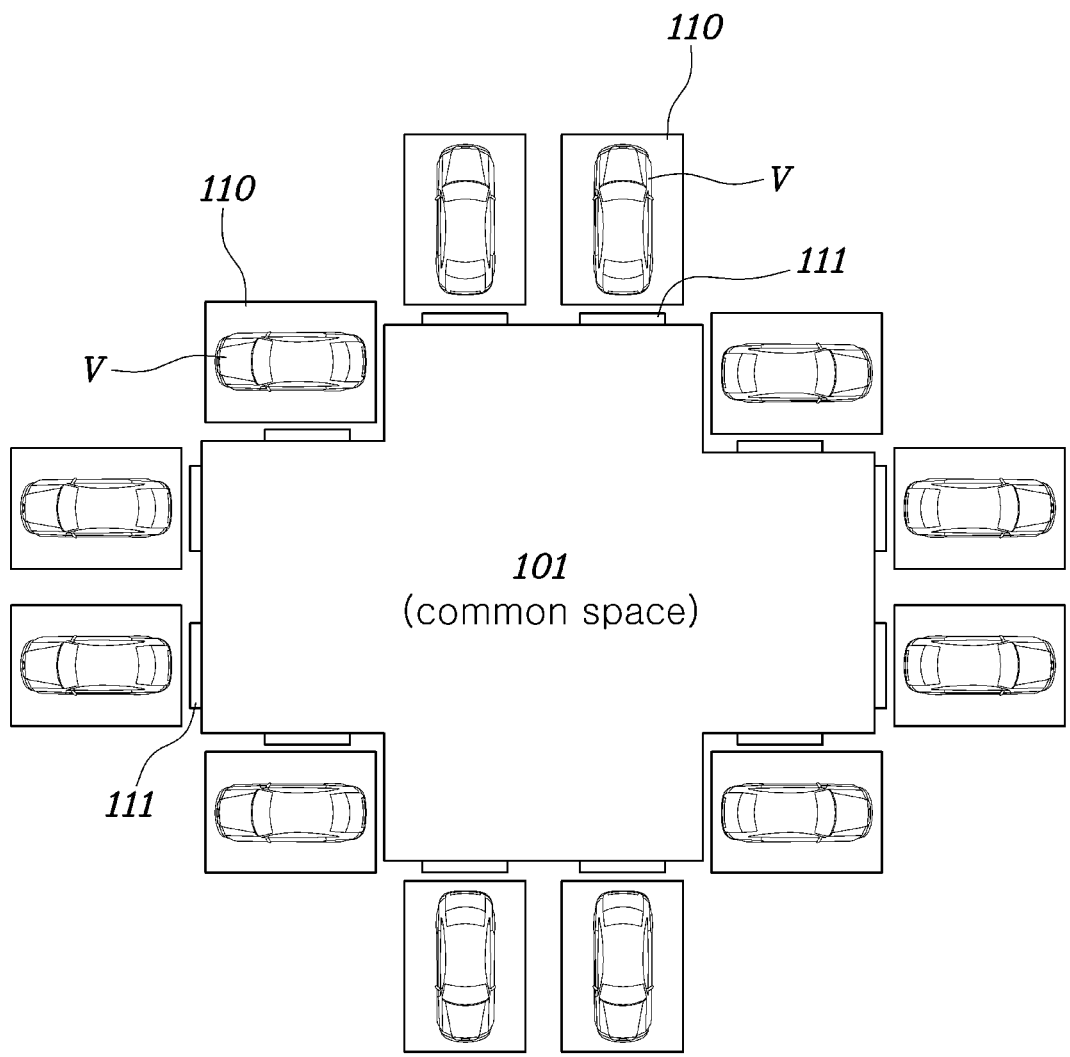
FIG. 2 is a view showing that vehicles are docked to a vehicle connection system of a multi-story building according to various exemplary embodiments of the present invention.

FIG. 2 is a view showing a state that vehicles are docked to a vehicle connection system of a multi-story building according to various exemplary embodiments of the present invention.

Referring to FIG. 2, a plurality of stations 110 may be provided outside the building 100, and a common space 101 may be provided at the center portion of a region surrounded by a plurality of stations 110. That is, the plurality of stations 110 may be configured to surround the common space 101. The vehicle V may be docked to the front, rear, or side from the outside of the building 100 and thus become a portion of the building 100.

Figure 3:
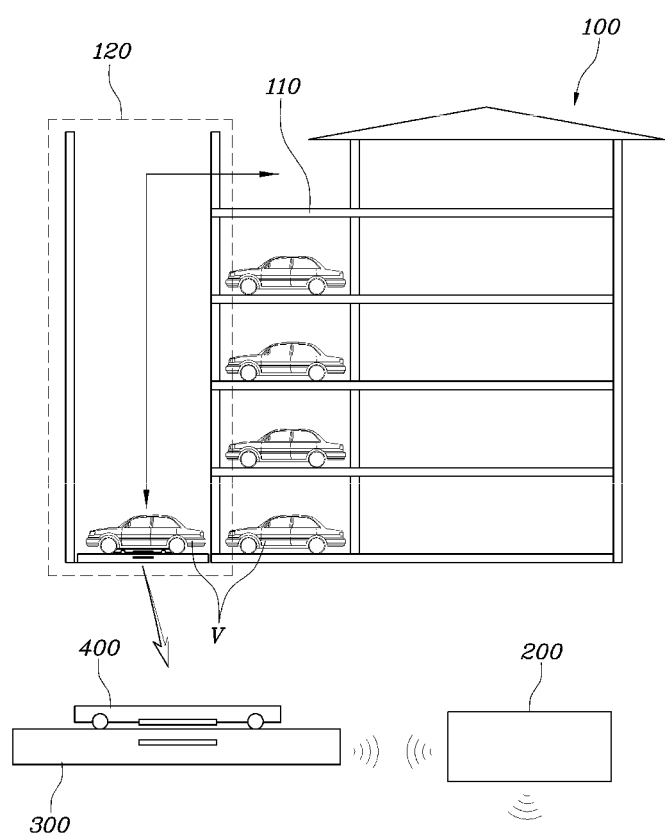
FIG. 3 is a diagram illustrating a process in which a vehicle is docked to a vehicle connection system of a multi-story building according to various exemplary embodiments of the present invention.

FIG. 3 is a diagram illustrating a process in which a vehicle V is docked in a vehicle connection system of a multi-story building according to various exemplary embodiments of the present invention.

Referring to FIG. 3, the parking robot 400 is placed in a standby state on the elevator board 300, and when the vehicle V enters the elevator 120, the vehicle V is loaded on the parking robot 400. The server 200 identifies the docking status of the stations 110 and then selects a docking point to which the vehicle V is docked from among empty stations 110.

When the docking point is determined, the elevator 120 is driven to move the elevator board 300 to the floor where the selected docking point is located. When the elevator board 300 moves to the corresponding floor, the parking robot 400 moves into the docking point on which the vehicle V is loaded. The parking robot 400 transports the vehicle V into the docking point, and then is away of the docking point to be placed on the elevator board 300 again. Thus, the vehicle V is docked to the station 110 and connected to the building 100. When the parking robot 400 completely transports the vehicle V, the parking robot 400 may transmit a completion signal to the server 200. When the server receives the completion signal, it is determined that the corresponding station 110 is in use, and thus any vehicle V entering subsequently is prevented from being docked at the docking point.

The parking robot 400 may perform a function of charging the vehicle V. The parking robot 400 may check a level of charge of the battery of the vehicle V and then determine whether charging of the battery is required according to the remaining level of charge. For example, when the remaining level of charge of the battery is equal to or less than 50% of a full level of charge, it may be set as a situation where charging is required.

When the vehicle V is loaded on the parking robot 400, the parking robot 400 may check a level of charge of the battery of the vehicle V and charge the battery when it is determined that charging of the battery is required. The parking robot 400 may be configured to wirelessly charge the battery of the vehicle V.

The elevator board 300 may be configured to charge the parking robot 400. The elevator board 300 is connected to the power system of the building 100 to be charged any times. When the parking robot 400 is placed in a standby state on the elevator board 300, the parking robot 400 may be charged. That is, the elevator board 300 is charged by the power system of the building 100; the elevator board 300 charges the parking robot 400; and the parking robot 400 charges the battery of the vehicle V.

Furthermore, a plurality of parking robots 400 may be provided at each floor of the building 100. The parking robot 400 provided on each floor checks a level of charge of the battery in the vehicle V docked to the station 110, and may charge the battery of the vehicle V when it is determined that charging of the battery is required. Therefore, each battery of the vehicle V may be charged in a state that the vehicle V is docked.

Furthermore, when the vehicle V is to be unloaded, the server 200 may perform control so that any one of the parking robots 400 provided at each floor is designated and then the vehicle is loaded on the designated parking robot. When a user wants the docked vehicle V to be unloaded, the user may transmit an unload request signal to the server 200. When the server 200 receives the unload request signal, the server 200 may perform control so that any one of parking robots 400 positioned at the docking point of the corresponding vehicle V is designated and then the vehicle to be unloaded is loaded on the designated parking robot 400. The designated parking robot 400 moves to the vehicle V to be unloaded, and when the corresponding vehicle V is loaded on the parking robot 400, the vehicle V may be moved by the elevator board 300.

Figure 4:
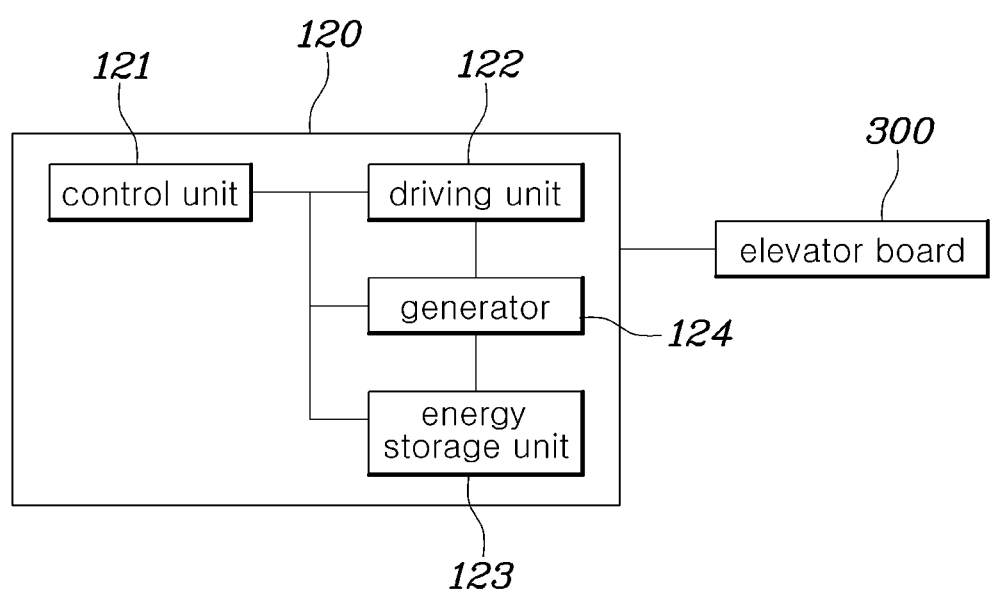
FIG. 4 is a schematic diagram showing an elevator of a vehicle connection system of a multi-story building according to various exemplary embodiments of the present invention.

FIG. 4 is a schematic diagram showing an elevator 120 of a vehicle connection system of a multi-story building according to various exemplary embodiments of the present invention.

Referring to FIG. 4, the elevator 120 may include a driving unit 122, a generator 124, an energy storage unit 123, and a control unit 121.

A vehicle connection system of a multi-story building according to various exemplary embodiments of the present invention may be configured to reuse regenerative power generated during operation of the elevator 120. When the elevator 120 disposed in the building 100 descends from an upper floor to a lower floor, the driving unit 122 of the elevator 120 may drive the generator 124 to convert descending energy into electrical energy.

The driving unit 122 is a device that drives up and down movements of the elevator 120. The generator 124 is a device that produces electrical energy by the driving unit 122. The electrical energy produced by the generator 124 may be stored in the energy storage unit 123. The energy storage unit 123 is connected to the elevator board 300 to charge the elevator board 300 using electrical energy charged in the energy storage unit 123.

The control unit 121 may control the driving unit 122 to control the up and down movements, and control to charge the elevator board 300 by use of the electrical energy charged in the energy storage unit 123. When the elevator board 300 descends from an upper floor to a lower floor, the electrical energy is stored in the generator 124, and the elevator board 300 is charged using the stored electrical energy, whereby there is an effect that the efficiency of energy may be increased.

Figure 5:
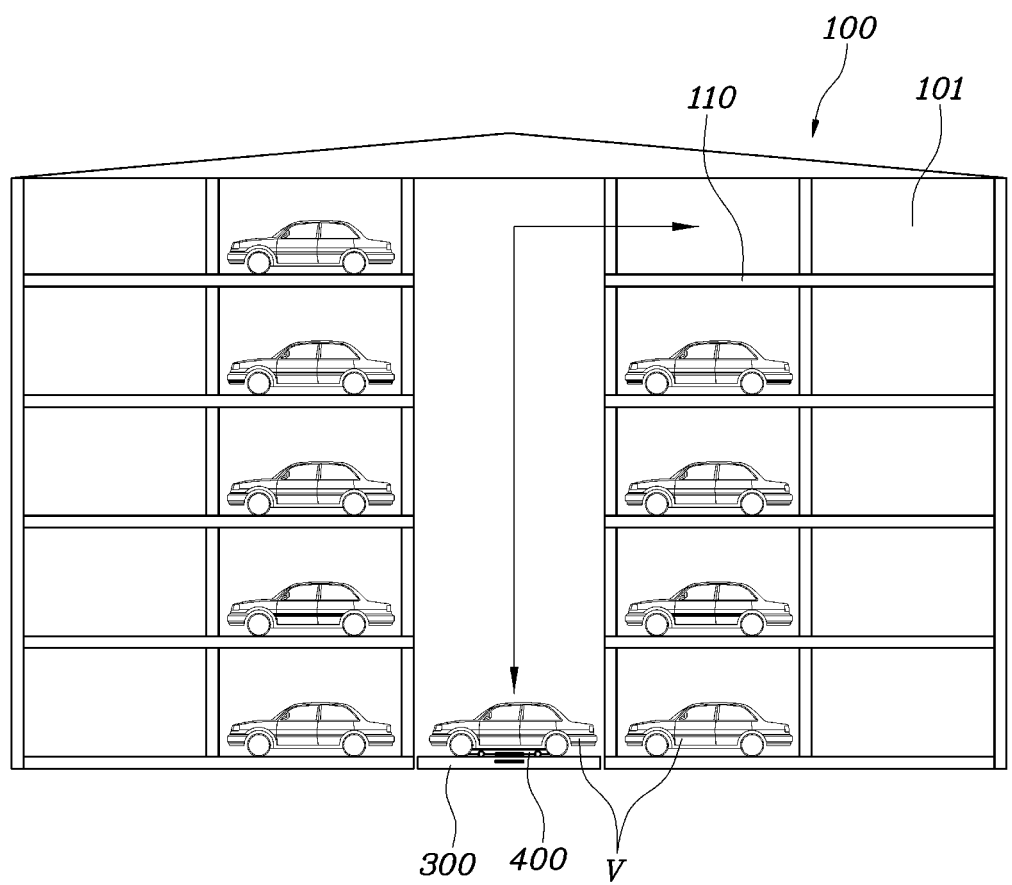
FIG. 5 is a view showing that vehicles are docked to a vehicle connection system of a multi-story building according to various exemplary embodiments of the present invention.

FIG. 5 is a view showing a process in which a vehicle V is docked to a vehicle connection system of a multi-story building according to various exemplary embodiments of the present invention.

Referring to FIG. 5, the station 110 may be provided inside the building 100. The vehicle V may be docked to the interior of the building 100 to become a portion of the building 100. An elevator 120 may be disposed at the center portion of the building 100. The station 110 may be located adjacent to elevator 120. According to another exemplary embodiment of the present invention, since the station 110 is provided inside the building 100, there is an advantage that the vehicle V may be docked without being affected by the external environment. Configurations and functions described in various exemplary embodiments of the present invention may be equally applied to other embodiments.

Figure 6:
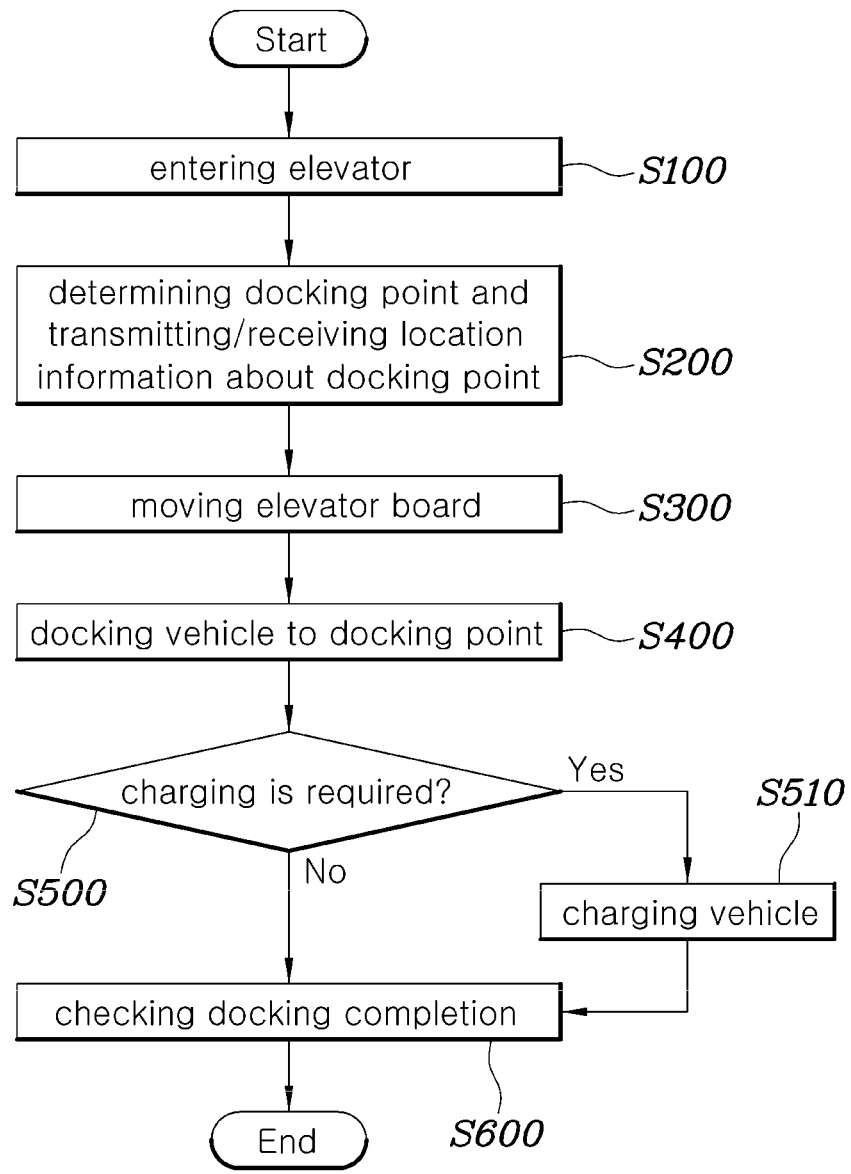
FIG. 6 is a flowchart showing a control method of a vehicle connection system of a multi-story building according to various exemplary embodiments of the present invention.

FIG. 6 is a flowchart showing a control method of a vehicle connection system of a multi-story building according to various exemplary embodiments of the present invention. Referring to FIG. 6, a control method of a vehicle connection system of a multi-story building according to various exemplary embodiments of the present invention includes a vehicle-entering step, a docking point-determining step, a moving step, a docking step, a step of determining whether charging of the battery is required, and a charging step.

In the vehicle-entering step S100, the vehicle V may enter the elevator 120 to be connected to the building 100. The vehicle V may be moved onto the elevator board 300 to be loaded on the parking robot 400.

In the docking point-determining step S200, the station 110 to which the vehicle V is connected may be determined. The server 200 may check the usage status of the station 110 and determine the station 110 to which the entered vehicle V is to be docked. When the docking point is determined, location information related to the docking point may be transmitted and received to or from the elevator board 300 and the parking robot 400.

In the moving step S300, the elevator 120 is driven so that the elevator board 300 may move to the floor where the docking point is located.

In the docking step S400, when the elevator board 300 arrives at the floor where the determined docking point is located, the parking robot 400 may move to the docking point in a state that the vehicle V is loaded on so that the vehicle V may be docked to the docking point. When the vehicle V is docked, the vehicle V is connected to the building 100 to become a portion of the building 100, so that the vehicle may be connected to an air conditioning system, a water and sewage system, a power system, and a communication system.

When the docking of the vehicle V is completed in the docking step, in the step S500 of determining whether charging of the battery is required, the parking robot 400 may check the charging state of the docked vehicle V to determine whether charging of the battery is required. Whether charging of the battery is required may be determined on the basis of a level of charge of the battery of the vehicle V. When the level of charge of the battery of the vehicle V is equal to or less than a predetermined amount of a full level of charge, it is determined that charging of the battery is required so that the parking robot 400 may charge the battery of the vehicle V.

In the charging step S510, the parking robot 400 may charge the battery of the vehicle V which is determined to require charging. Herein, the level of charge may be determined in advance, and when the vehicle V is charged to be higher than a predetermined amount of a full level of charge in S600, it may be said that charging is completed. When charging is completed, the parking robot 400 may transmit a docking completion signal to the server 200.

Furthermore, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle connection system of a building having a plurality of floors, the system comprising:
   the building having the plurality of floors, provided with an elevator moving between the plurality of floors, and having at least a station provided inside or outside of the building so that a vehicle is configured to be docked to the at least a station;
   an elevator board provided at a bottom portion of the elevator to allow the vehicle to be loaded to the elevator or unloaded from the elevator and moving between the plurality of floors of the building when the elevator is driven;
   a parking robot which is disposed in a standby state on the elevator board, and when the vehicle enters the elevator board, allows the vehicle to be loaded on the elevator board and moved to a docking point; and
   a server communicatively connected to the building, the elevator board, and the parking robot, and configured to manage statuses of the at least a station and to designate the docking point when the vehicle enters the elevator, and transmit information related to the docking point to the elevator board and the parking robot.

2. The system of claim 1, wherein when the vehicle enters the elevator and then a target floor is selected among the plurality of floors, the server is configured to designate the docking point to transmit the information related to the docking point to the parking robot, and causes the elevator board to move toward the selected target floor and then the parking robot to move the vehicle to the docking point.

3. The system of claim 1, wherein the parking robot checks a level of charge of a battery of the vehicle when the vehicle is loaded on the parking robot, and charges the battery of the vehicle when the parking robot concludes that charging of the battery is required.

4. The system of claim 3, wherein the elevator board is connected to a power system of the building to charge the parking robot when the parking robot is disposed in the standby state on the elevator board.

5. The system of claim 1, wherein a plurality of parking robots is provided at each of the plurality of floors in the building to check a level of charge of a battery of the vehicle docked at the at least a station and to charge the battery of the vehicle when at least one of the parking robots concludes that charging of the battery is required.

6. The system of claim 1, wherein a plurality of parking robots is provided at each of the plurality of floors in the building, and when the vehicle is to be unloaded from the building, the server is configured to designate one of the parking robots at a floor where the docking point is located among the plurality of floors so that the vehicle to be unloaded is loaded on the designated parking robot.

7. The system of claim 1, wherein the elevator includes a driving unit configured of driving up and down movements of the elevator, an energy storage unit configured of storing electrical energy generated by the driving unit when the elevator board descends from a higher floor to a lower floor among the plurality of floors, and a control unit electrically connected to the driving unit and the energy storage unit and configured of controlling the driving unit and the energy storage unit.

8. The system of claim 7, wherein the control unit is configured of controlling to charge the elevator board using regenerative power stored in the energy storage unit.

9. The system of claim 8, wherein when the elevator disposed in the building descends from the higher floor to the lower floor, the driving unit of the elevator is configured to drive a generator mounted in the elevator and connected to the energy storage unit to convert a potential energy of the elevator into electrical energy to generate the regenerative power.

10. The system of claim 1, wherein the at least a station is provided outside the building, and the vehicle is docked and connected to an outside of the building for the vehicle to be a portion of the building.

11. The system of claim 10, wherein a common space is provided at a center portion of a region in the building surrounded by the at least a station.

12. The system of claim 1, wherein the at least a station is provided inside the building, and the vehicle is docked and connected to an interior of the building for the vehicle to be a portion of the building.

13. The system of claim 1, wherein the at least a station is provided with a sealing member configured of contacting a frame of the vehicle to be docked to form a seal.

14. A method of controlling a vehicle connection system of a building having a plurality of floors and an elevator, the method including:
   loading a vehicle on a parking robot when the vehicle enters the elevator of the building;
   determining a docking point at which the vehicle is connected, and transmitting and receiving location information related to the docking point to or from an elevator board and the parking robot;
   driving the elevator so that the elevator board moves to a floor where the docking point is located among the plurality of floors; and
   when the elevator board arrives on the floor where the docking point is located among the plurality of floors, moving the parking robot to the docking point in a state that the vehicle is loaded on the parking robot, and docking the vehicle at the docking point to allow the building and the vehicle to be connected to each other.

15. The method of claim 14, further including: after the docking of the vehicle,
   checking, by the parking robot, a charging state of a battery in the docked vehicle and determining by the parking robot, whether charging of the battery is required; and
   charging, by the parking robot, the battery of the vehicle when the parking robot concludes that the charging of the battery is required.

16. The method of claim 15, wherein the determining whether the charging of the battery is required includes determining that the charging is required when a level of charge of the battery in the vehicle is equal to or less than a predetermined amount of a full level of the charge.

17. The method of claim 14, wherein the vehicle connection system includes:
   the building having the plurality of floors, provided with the elevator moving between the plurality of floors, and having at least a station provided inside or outside of the building so that the vehicle is configured to be docked to the at least a station;
   the elevator board provided at a bottom portion of the elevator to allow the vehicle to be loaded to the elevator or unloaded from the elevator and moving between the plurality of floors of the building when the elevator is driven;
   the parking robot which is disposed in a standby state on the elevator board, and when the vehicle enters the elevator board, allows the vehicle to be loaded on the elevator board and moved to the docking point; and
   a server communicatively connected to the building, the elevator board, and the parking robot, and configured to manage statuses of the at least a station and to designate the docking point when the vehicle enters the elevator, and transmit information related to the docking point to the elevator board and the parking robot.

* * * * *